(12) United States Patent
Sucharitakul

(10) Patent No.: US 9,817,694 B2
(45) Date of Patent: Nov. 14, 2017

(54) METHOD AND SYSTEM FOR PROVIDING A PIPELINE INFRASTRUCTURE

(71) Applicant: PAYPAL, INC., San Jose, CA (US)

(72) Inventor: Akara Sucharitakul, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 91 days.

(21) Appl. No.: 14/706,786

(22) Filed: May 7, 2015

(65) Prior Publication Data

US 2016/0328263 A1 Nov. 10, 2016

(51) Int. Cl.
G06F 9/46 (2006.01)
G06F 7/00 (2006.01)
G06F 3/00 (2006.01)
G06F 9/48 (2006.01)

(52) U.S. Cl.
CPC .................... *G06F 9/4843* (2013.01)

(58) Field of Classification Search
None
See application file for complete search history.

(56) References Cited

U.S. PATENT DOCUMENTS

| 8,806,506 B2* | 8/2014 | Malladi ................. H04L 67/34 |
| | | 719/313 |
| 2013/0080505 A1 | 3/2013 | Nielsen |
| 2014/0007132 A1 | 1/2014 | Gaxiola et al. |
| 2014/0181252 A1 | 6/2014 | Malladi et al. |
| 2014/0351827 A1 | 11/2014 | Llamas |
| 2015/0134695 A1* | 5/2015 | Zhao ................. G06F 17/30587 |
| | | 707/769 |

* cited by examiner

*Primary Examiner* — Bing Zhao
(74) *Attorney, Agent, or Firm* — Haynes and Boone, LLP

(57) ABSTRACT

Systems and methods for providing a pipeline as a service are provided. An example method includes performing, at the incoming pipeline handler, a first action on a first request. The incoming pipeline handler is part of an incoming pipeline in a first application framework. The method also includes performing, at the incoming pipeline handler, a second action on a second request. The incoming pipeline handler is part of the incoming pipeline in a second application framework.

18 Claims, 10 Drawing Sheets

METHOD AND SYSTEM FOR PROVIDING A PIPELINE INFRASTRUCTURE

CROSS-REFERENCE TO RELATED APPLICATION(S)

The present application is related to the following co-pending applications each filed on even date herewith: (1) U.S. application Ser. No. 14/706,777 entitled "Method and System for Log Aggregation" and naming Akara SUCHARITAKUL as the sole inventor and (2) U.S. application Ser. No. 14/706,542 entitled "Method and System for Providing a Framework as a Service" and naming Akara SUCHARITAKUL as the sole inventor. Each of the aforementioned applications is incorporated by reference herein.

BACKGROUND

Field of the Disclosure

The present disclosure generally relates to computing systems and more particularly to providing a pipeline infrastructure.

Related Art

Companies invest heavily in protecting their electronic assets. A system breach may result in lost profits and a decline in consumer confidence in a company. A large portion of business is done through networked computers. Nowadays, applications may be written to run on different platforms, stacks, and programming environments. It is oftentimes a daunting task to defend these applications against intrusion. Additionally, even if a solution were found, it may be difficult to rollout crucial fixes to the applications in a short amount of time. Each fix may be a huge engineering effort associated with high costs and a lot of manpower.

Figure 1:
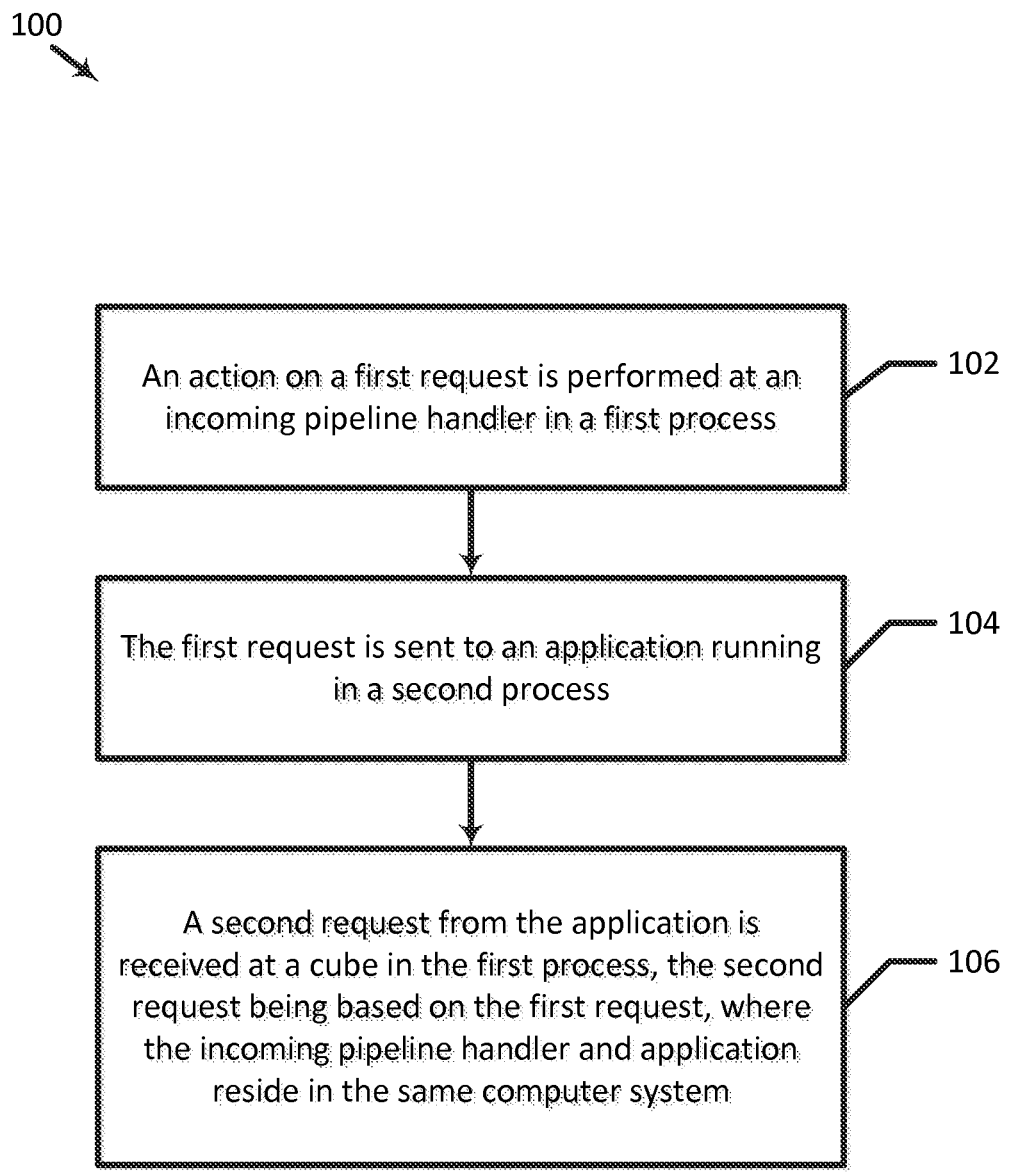
FIG. 1 is a flowchart illustrating an embodiment of a method for providing a framework as a service.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

I. Example Method
II. Example System Architecture
  A. Pipeline Handlers
  B. API Shim
  C. Framework as a Service
III. Process Flow of an Application Receiving a Decorated Request and Retrieving Information Responsive to the Request
  A. Logging Pipeline Handler
  B. Personalization Pipeline Handler
    1. Incoming Personalization Pipeline Handler Decorates the Request
    2. Application Processes the Personal Information Included in the Decorated Request
  C. Tracking Pipeline Handler
    1. Incoming Tracking Pipeline Handler Decorates the Request
    2. Application Processes the Tracking Information Included in the Decorated Request
  D. Experimentation Pipeline Handler
  E. Client Proxy
IV. Process Flow of a Response Traversing the Pipeline Handlers in the Outgoing Pipeline
V. Pipeline as a Service
  A. Pipeline as a Service May be Coupled to Multiple Frameworks
  B. Pipeline as a Service May be Coupled to Other Infrastructure Components
VI. Log Aggregation
VII. Example Methods
VIII. Example Computing Systems
I. Example Method An application framework may generally refer to a software architecture that allows applications to plug their business logic in. Components of an application framework usually run in the same process and are typically tightly integrated within the application. It may be desirable to provide a framework as a service.

The present disclosure provides a system and method for providing a framework as a service. FIG. 1 is a flowchart illustrating an embodiment of a method 100 for providing a framework as a service. Method 100 is not meant to be limiting and may be used in other applications other than the applications discussed below. Method 100 includes blocks 102-106. In a block 102, an action on a first request is performed at an incoming pipeline handler in a first process. A framework may be provided as a service to different applications. The framework may include pipeline handlers and cubes. For example, a computer system may include pipeline handlers and cubes, and also run one or more applications. An application may run on the computer system in a first process, and the pipeline handlers and cubes may run in a second process that is separate from the first process. Accordingly, another application running in a third process in the computer system may plug into the framework and use the services of the pipeline handlers and cubes. The pipeline handler may decorate a request to an application with information that is used by the application. The pipeline handler may decorate a request by adding information to the request and passing it along to the next component, which may be another pipeline handler in the pipeline or the application.

In a block 104, the first request is sent to the application running in a second process. In a block 106, a second request from an application is received at a cube in the first process, the second request being based on the first request. The incoming pipeline handler and application may reside in the same computer system. The cube may respond to requests from the application, as will be further discussed below.

Figure 2:
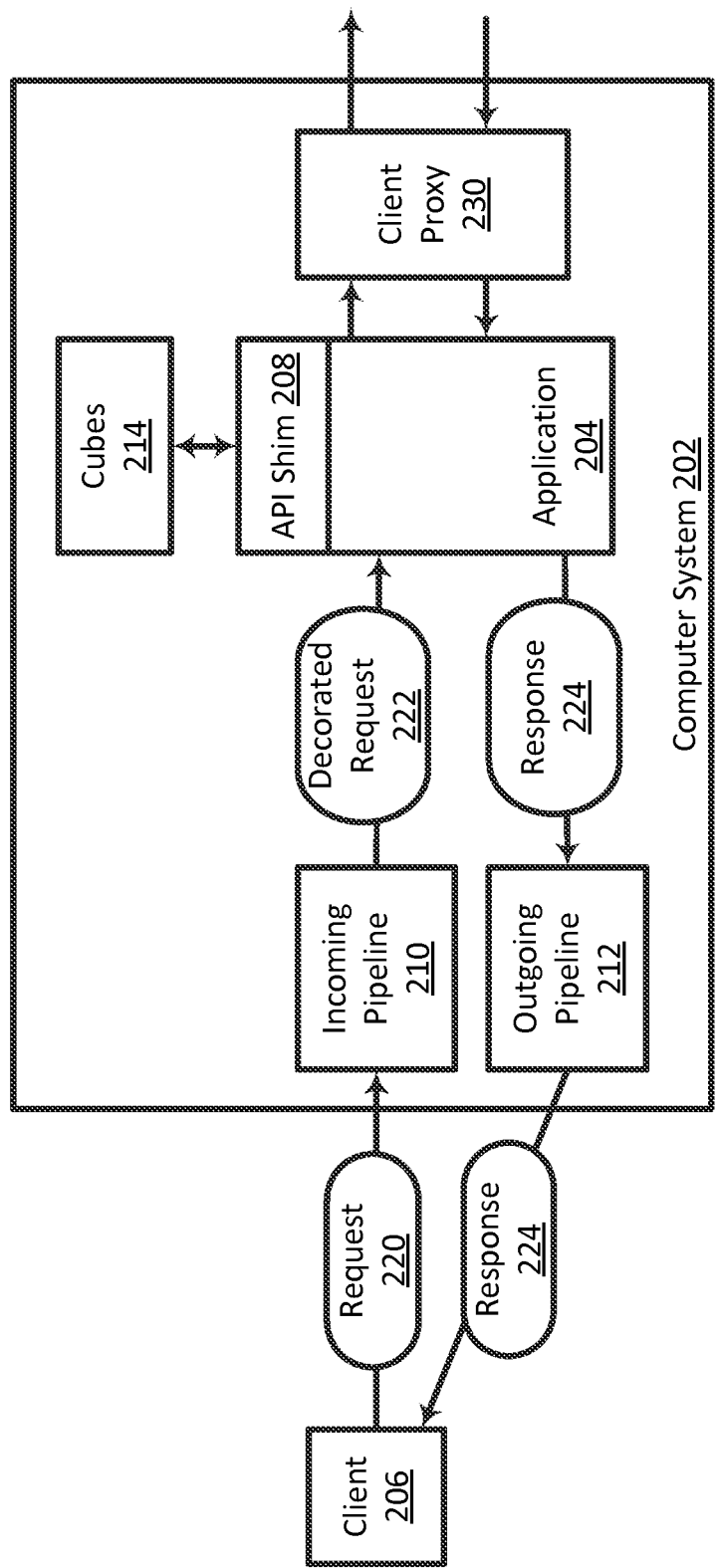
FIG. 2 is a schematic view illustrating an embodiment of a system that implements a framework as a service.

It should be understood that additional processes may be performed before, during, or after blocks 102-106 discussed above. It is also understood that one or more of the blocks of method 100 described herein may be omitted, combined, or performed in a different sequence as desired II. Example System Architecture FIG. 2 is a schematic view 200 illustrating an embodiment of a system that implements a framework as a service. In FIG. 2, computer system 202 includes an application 204, incoming pipeline 210, outgoing pipeline 212, and cubes 214. Incoming pipeline 210 may include incoming pipeline handlers that intercept and act on requests to application 204. In an example, a client 206 may send a request 220 through a network to application 204 for processing.

A. Pipeline Handlers

One or more incoming pipeline handlers may perform actions on request 220 before it reaches the application. In an example, incoming pipeline handlers may decorate request 220, thus generating a decorated request 222 that is passed along to application 204 for processing. A request may be decorated by adding information to the request. An incoming pipeline handler may also keep track of how the request has been decorated. Outgoing pipeline 212 may include outgoing pipeline handlers that intercept and act on responses from application 204. Application 204 may process decorated request 222 and provide a response 224 responsive to the request. One or more outgoing pipeline handlers may perform actions on response 224 before it is sent to client 206.

An incoming and/or outgoing pipeline may be associated with and provided as part of a cube, which may provide multiple services and functions. An infrastructure may refer to a hardware or software component that is not part of the application logic or application code, but may provide services (e.g., load balancer or firewall). The pipeline infrastructure is the machinery that executes the pipeline handlers, and the pipelines may reference the cubes. Application 204 may call into a cube by invoking an application programming interface (API) call to request the cube's services. Cubes 214 respond to requests from application 204 and may be a service delivery architecture. A cube may obtain information from pipeline handlers (in incoming pipeline 210 and/or outgoing pipeline 212) and/or via a service call to a computer system outside of computer system 202. The cube may make the outside service call if computer system 202 does not store all the information for responding to a request from application 204.

B. API Shim

Application 204 is associated with an API shim 208 that may be implemented for every language in which application 204 is written. In an example, if application 204 is written in Python, API shim 208 is a Python API shim. Using API shim 208, it may be unnecessary to update application 204 and the infrastructure for it because the infrastructure has been generalized with the use of pipeline handlers and cubes.

API shim 208 may be a small library that sits with application 204 inside the same address space. API shim 208 may communicate with cubes 214 by making calls through hypertext transfer protocol (HTTP) or by sending messages through a messaging queue to cubes 214. In particular, API shim 208 may communicate with a service inside a cube similarly to a regular service call except that API shim 208 and the cube both reside in computer system 202.

Application 204 may want to talk to other services and databases outside of computer system 202. As will be explained further below, application 204 may communicate with a client proxy 230 to communicate with other information sources.

C. Framework as a Service

Application 204 and each of the pipeline handlers and cubes are executable on computer system 202 and may reside in the same computer system. Each of the pipeline handlers and cubes may be software modules executable on one or more hardware processors included in computer system 202. In some examples, incoming pipeline 210, outgoing pipeline 212, and cubes 214 are referred to as a framework that may be provided as a service to one or more applications. In particular, incoming pipeline 210, outgoing pipeline 212, and cubes may be implemented as a framework as a service. The framework as a service may be coupled to one or more applications.

The framework as a service may be in a different process than the applications that communicate with the framework as a service. In particular, application 204 may run in a different process than the incoming and outgoing pipeline handlers and cubes. In other words, the components in the framework may be separate from application 204. In an example, application 204 may run in a first process that is separate from a second process in which incoming pipeline 210, outgoing pipeline 212, and cubes 214 run. Additionally, the application may run in the same or different virtual machine as incoming pipeline 210, outgoing pipeline 212, and cubes 214.

When a cube is installed in the framework as a service, the application may look inside the cube and identify services provided by the cube. In an example, request 220 includes a unique identifier (e.g., globally unique identifier (GUID)), and application 204 invokes one or more APIs exposed by cube 214 for information based on the identifier. If cubes 214 are implemented for a framework as a service, the cubes may be configured to listen for an incoming request and an outgoing response in order to function properly.

In some examples, an incoming pipeline handler and its associated outgoing pipeline handler and cube may be added to the infrastructure. As such, pipeline handlers and cubes may be "plugged" into the infrastructure and provided as a service to one or more applications. For example, incoming pipeline handlers and outgoing pipeline handlers may be added to incoming pipeline 210 and outgoing pipeline 212, respectively. Similarly, one or more cubes may be added to cubes 214 and communicate with application 204 via API shim 208. An advantage of "plugging" pipeline handlers and cubes into the infrastructure may provide flexibility because new pipeline handlers and cubes may be independently incorporated into the infrastructure. This may be particularly advantageous if pipeline handlers and their associated cubes (if applicable) are supplied by different teams of developers.

If the environment in which computer system 202 is in or interacts with has been compromised, a security development team may provide security pipeline handlers and a security cube and add them to the infrastructure. For example, if request 220 is received, incoming pipeline 210 may include an incoming security handler that decorates the request with security information. In an example, the security information asks whether this particular request is permitted to access application 204. If the request is permitted, the incoming security handler may pass the request along in the pipeline or to application 204. If the request is not permitted, the incoming security handler may drop the request and send an error message to the sender of the request. In another example, the security cube may have one or more APIs, and the security pipeline handler may make an API call into the security cube to ensure that particular actions are allowed. Accordingly, rather than implement one fix for all the application stacks, the security pipeline hander and cube may be used to secure the environment in which multiple applications operate because the framework as a service sits in a different process than the applications. Additionally, the fix provided by the security pipeline hander and cube may be applied in a shorter amount of time compared to providing a fix for all the application stacks. Moreover, if another security issue arises, the security cube may be updated with a new version of the security pipeline handler.

Figure 3:
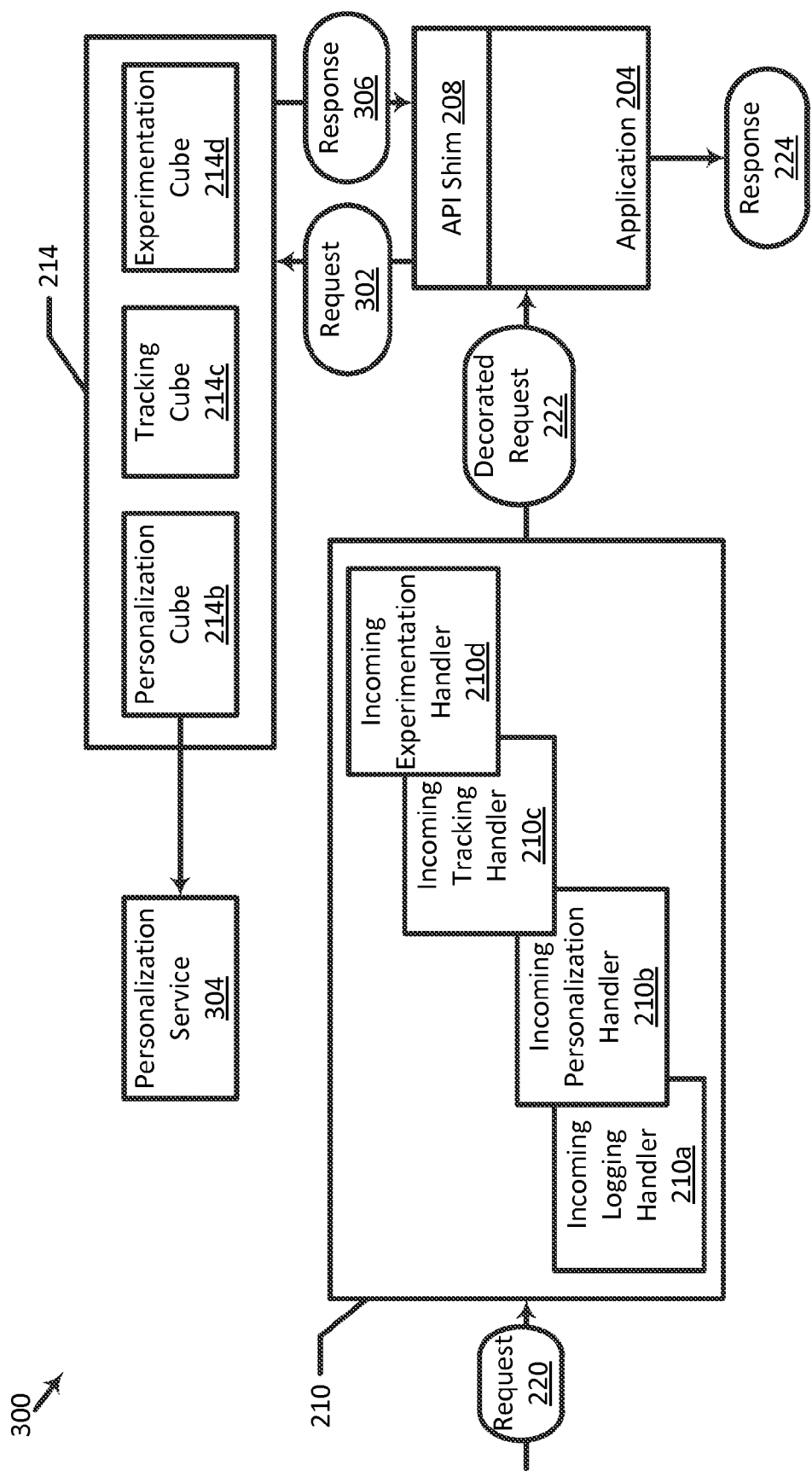
FIG. 3 is a schematic view illustrating an embodiment of an incoming pipeline and cubes 214 in more detail.
Figure 4:
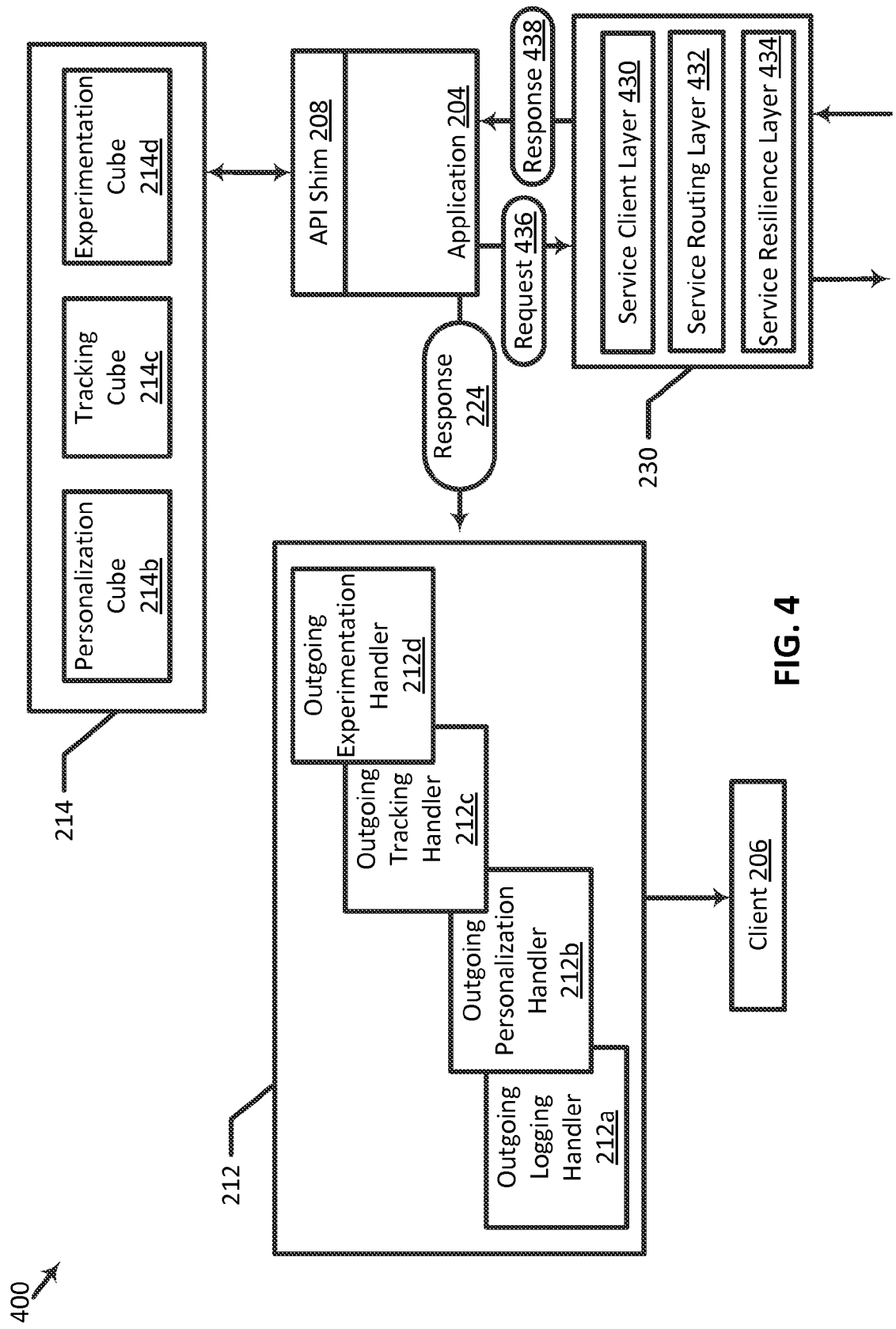
FIG. 4 is a schematic view illustrating an embodiment of an outgoing pipeline and a client proxy in more detail.

III. Process Flow of an Application Receiving a Decorated Request and Retrieving Information Responsive to the Request FIG. 3 is a schematic view 300 illustrating an embodiment of incoming pipeline 210 and cubes 214 in more detail. FIG. 4 is a schematic view 400 illustrating an embodiment of outgoing pipeline 112 and client proxy 230 in more detail. FIGS. 3 and 4 are discussed together to better understand some aspects of the disclosure. In FIG. 3, incoming pipeline 210 includes an incoming logging handler 210a, an incoming personalization handler 210b, an incoming tracking handler 210c, and an incoming experimentation handler 210d. These incoming pipeline handlers are part of incoming pipeline 210. Additionally, cubes 114 include a personalization cube 214b, a tracking cube 214c, and an experimentation cube 214d. In FIG. 4, outgoing pipeline 112 includes an outgoing logging handler 212a, an outgoing personalization handler 212b, an outgoing tracking handler 212c, and an outgoing experimentation handler 212d. These outgoing pipeline handlers are part of outgoing pipeline 212. Additionally, client proxy 230 includes a service client layer 430, a service routing layer 432, and a service resilience layer 434.

Incoming logging handler 210a is associated with outgoing logging handler 212a. Incoming personalization handler 210b is associated with personalization cube 214b and outgoing personalization handler 212b. Incoming tracking handler 210c is associated with tracking cube 214c and outgoing tracking handler 212c. Incoming experimentation handler 210d is associated with experimentation cube 214d and outgoing experimentation handler 212d.

It should be understood that the order of pipeline handlers in a pipeline may be modified if the pipeline handlers have no dependencies. If two pipeline handlers have no dependencies, the order in which a request or response is processed with respect to the two pipeline handlers may be modified. In an example, based on dependencies, incoming tracking handler 210c should be before the incoming experimentation handler 210d in incoming pipeline 210. Accordingly, it is undesirable to modify their order. In another example, a security pipeline handler does not have dependencies. Accordingly, the security pipeline handler may be placed anywhere in the pipeline.

A pipeline handler may be supplied as part of its associated cube. Cubes may respond to requests from application 214. Services within a cube may be unable to determine the boundaries of a request to or response from application 204. The pipeline handlers inside incoming pipeline 210 or outgoing pipeline 212 may understand those boundaries and ensure that the request and/or response is processed accordingly.

A. Logging Pipeline Handler

In FIG. 3, incoming logging handler 210a may be added to the infrastructure to intercept requests to application 204 before they are received by the application and may log each of those requests. Logging handler 210a may decorate the request with logging information. Logging information may include, for example, the date and time the request was received and an identifier that identifies the recipient of the request. In an example, request 220 may be given a unique identifier (e.g., globally unique identifier (GUID)) that is included in the request. In such an example, incoming logging handler 210a may identify the unique identifier in the request and log the unique identifier along with other information. Incoming logging handler 210a may be separate from and run in a different process than application 204. As such, it may be unnecessary for incoming logging handler 210a to be integrated into application 204.

Request 220 may traverse each of the pipeline handlers included in incoming pipeline 210 before being sent to application 204. If another pipeline handler is included in incoming pipeline 210 after incoming logging handler 210a, request 220 may be passed along to this next pipeline handler; otherwise, incoming logging handler 210a may pass request 220 to application 204.

B. Personalization Pipeline Handler

1. Incoming Personalization Pipeline Handler Decorates the Request

In FIG. 3, incoming logging handler 210a may pass request 220 to incoming personalization handler 210b, which may decorate request 220 by adding personal information to the request. Incoming personalization handler 210b may be separate from and run in a different process than application 204. As such, it may be unnecessary for incoming personalization handler 210b to be integrated into application 204.

In an example, client 206 (see FIG. 2) is a Web browser, and incoming personalization handler 210b identifies a user associated with client 206 likely to have sent request 220. The user may have used the same Web browser to access application 204 multiple times. For example, incoming personalization handler 210b may associate the user with a cookie, which is a small file containing a string of characters sent to the Web browser. Incoming personalization handler 210b may determine that request 220 was sent from that particular user and also determine the user's personal information based on the received cookie. In an example, the user is "Jane Doe," and her area of interest is fashion.

Incoming personalization handler 210b may decorate request 220 with the personal information (e.g., name of the user is Jane Doe and fashion as her area of interest) to generate at least a portion of decorated request 222. If another pipeline handler is included in incoming pipeline 210 after incoming personalization handler 210b, request 220 may be passed along to this next pipeline handler; otherwise, incoming personalization handler 210b may pass decorated request 220 to application 204.

2. Application Processes the Personal Information Included in the Decorated Request Application 204 may receive decorated request 222 from incoming pipeline 210 and identify the personal information in the request. In an example, application 204 is a homepage application that identifies elements based on the personal information in decorated request 220 and renders the elements into the homepage. The homepage including the elements will be displayed to the user. For example, in response to discovering that Jane Doe's area of interest is fashion, application 204 may include the latest fashion trends in the homepage (e.g., most popular shoes and purses of Y2014).

An incoming pipeline handler may decide how much to decorate a request. If the incoming pipeline handler provides too much information in the request, then too much information may be passed to application 204 and decorated request 22 may be too big. Information not included in the request but wanted from application 204 may be requested from the cube associated with the pipeline handler. If application 204 does not have enough information (e.g., Jane Doe's area of interest, age, etc.) based on the personal information in decorated request 222 to render the homepage, application 204 may send a request 302 to personalization cube 214b for more information about Jane Doe. Request 302 may be a request for Jane Doe's area of interest, age range, gender, and location.

In some examples, application 204 uses API shim 208 to call into personalization cube 214b to request information about Jane Doe. In an example, request 220 is associated with a username and password, and application 204 provides this information in request 302 to personalization cube 214b so that it can obtain personal information for the correct person. API shim 208 may send request 302 via an HTTP call or a messaging queue to personalization cube 214b to request information from personalization cube 214b about Jane Doe. In an example, personalization cube 214b may communicate with one or more personalization services 304 to request information about the user. Personalization service 304 may be any information source (e.g., within the enterprise or outside of the enterprise) and may return a response including at least some of the requested information.

Responsive to request 302, personalization cube 214b may send response 306 including the requested information to application 204. Application 204 receives response 306, which may include personal information about Jane Doe. In an example, response 306 specifies that Jane Doe's area of interest is fashion, she is female and between the ages of 24-30, and resides in Austin, Tex. After application 204 is finished processing decorated request 222 received from incoming pipeline 210, application 204 may create a response 224 responsive to request 220.

C. Tracking Pipeline Handler

1. Incoming Tracking Pipeline Handler Decorates the Request

In FIG. 3, incoming personalization handler 210b may pass request 220 to incoming tracking handler 210c, which may decorate request 220 by adding tracking information to the request. Incoming tracking handler 210c may be separate from and run in a different process than application 204. As such, it may be unnecessary for incoming tracking handler 210c to be integrated into application 204.

Incoming tracking handler 210c may decorate request 220 with the tracking information (e.g., a list of Jane Doe's behaviors "X," "Y," and "Z" to track) to generate at least a portion of decorated request 222. For example, the tracking information may include behaviors such as the user's purchases, etc. If another pipeline handler is included in incoming pipeline 210 after incoming tracking handler 210c, request 220 may be passed along to this next pipeline handler; otherwise, incoming tracking handler 210c may pass decorated request 220 to application 204.

2. Application Processes the Tracking Information Included in the Decorated Request Application 204 may receive decorated request 222 from incoming pipeline 210 and identify the tracking information in the request. In an example, the tracking information is a request to application 204 to track the user's purchasing behavior. Application 204 may make a service call into tracking cube 214c (e.g., invoke an API) specifying that application 204 is tracking the user's purchasing behavior. Application 204 may continue to execute logic, and responsive to observing the user purchase a good or service or browsing particular goods or services, application 204 may make another service call into tracking cube 214c to inform it of the user's purchases or browsing behavior. In this way, tracking cube 214c may then log the user's purchasing behavior and browsing behavior. After application 204 is finished processing decorated request 222 received from incoming pipeline 210, application 204 may create a response 224 responsive to request 220.

D. Experimentation Pipeline Handler

In FIG. 3, incoming tracking handler 210c may pass request 220 to incoming experimentation handler 210d, which may decorate request 220 by adding experimentation information to the request. Incoming experimentation handler 210d may be separate from application 204. As such, it may be unnecessary for incoming experimentation handler 210d to be integrated into application 204.

Incoming experimentation handler 210d may decorate request 220 with the experimentation information (e.g., what information to provide to the user based on her choices) to generate at least a portion of decorated request 222. Experimentation information may include displaying different advertisements or colors on the webpage to the user and recording the user's behavior. If another pipeline handler is included in incoming pipeline 210 after incoming experimentation handler 210d, request 220 may be passed along to this next pipeline handler; otherwise, experimentation handler 210d may pass decorated request 220 to application 204. Application 204 may receive decorated request 222 from incoming pipeline 210 and identify the experimentation information in the request.

It should be understood that decorated request 222 may include at least one of logging information, personalization information, tracking information, and experimentation information.

E. Client Proxy

In keeping with the above example in which fashion is Jane Doe's area of interest, application 204 may send a search request for appropriate promotion items (e.g., shoes and purses) that fit the user's profile. Application 204 may want to talk to other services and databases outside of computer system 202. To do so, application 204 may send requests to client proxy 230, which may be thought of as a cube that provides services.

In FIG. 4, client proxy 230 includes a client service layer 430, a client routing layer 432, and a client resilience layer 434. In an example, service client layer 430 communicates with service routing layer 432 to identify a uniform resource locator (URL) to which promotion items map. Service client layer 430 may make a service call to a service remote from computer system 202. In an example, the service is a search service, and service client layer 430 does not know where the item is located. The search service may be given a common name that is a URL or uniform resource identifier (URI), which may not have a location.

In some examples, the URL depends in which data center computer system 202 is located because it may be desirable to not cross data centers (although this may happen). Service routing layer 432 may also determine the URL based on the environment in which computer system 202 is in and whether it is requesting information from an internal or external service. For example, if computer system 202 is located in a quality assurance environment in Phoenix, service routing layer 432 may send the request for one or more promotion items to "itemservice.QA.phoenix.acme.com." In contrast, if computer system 202 is located in a production environment in Salt Lake City, service routing layer 432 may send the request for one or more promotion items to "itemservice.prod.SLC.acme.com." Client routing layer 432 may then route request 436 to the URL or URI to retrieve the promotion item(s). Service resilience layer 434 may watch for a response responsive to request 436.

Client proxy 230 may obtain promotion items, include the promotion items in response 438, and send response 438 to computer system 202. In this example, client proxy 230 receives a list of fashion items that application 204 will render into the homepage for the user to view. In FIG. 4, application 204 sends response 224, which includes the promotion items, through outgoing pipeline 212 for processing. In an example, application 204 may send response 224 to client 206, and outgoing pipeline 212 may intercept the response without application 204 knowing.

If the "itemservice" does not respond, it may be overcapacitated. If client proxy 230 does not receive a response from the search service within a threshold amount of time, service resilience layer 434 sends response 438 to application 204, where response 438 includes an indication that the search service is not responding. The threshold amount of time may be based on a service level agreement or a pre-defined timeframe. In this way, service resilience layer 434 may prevent application 204 from hanging indefinitely. A waiting application is a blocking application that hogs useful resources and prevents them from being available to other applications or components executing in computer system 202.

IV. Process Flow of a Response Traversing the Pipeline Handlers in the Outgoing Pipeline Application 204 may include in response 224 the unique identifier that was included in request 220. Application 204 sends response 224 to outgoing pipeline 212. Response 224 may traverse each of the pipelines in outgoing pipeline 212 in a linear fashion, starting from outgoing experimentation handler 212d to outgoing logging handler 212a. Each of outgoing experimentation handler 212d, outgoing tracking handler 212c, outgoing personalization handler 212b, and outgoing logging handler 212a may be separate from application 204. As such, it may be unnecessary for outgoing experimentation handler 212d, outgoing tracking handler 212c, outgoing personalization handler 212b, and/or outgoing logging handler 212a to be integrated into application 204. An outgoing pipeline handler may extract information from response 224 and send the information to an associated cube or to an information repository.

Outgoing experimentation handler 212d receives response 224 and closes out request 220 for the request identifier included in the response. By outgoing experimentation handler 212d closing out request 220, this indicates to experimentation cube 214d that the request has been responded to by the application. Additionally, responsive to the close indication by outgoing experimentation handler 212d, experimentation cube 214d may push out the experimentation information to other information systems (e.g., an associated cube or to an information repository).

If another pipeline handler is included in outgoing pipeline 212 after outgoing experimentation handler 212d, response 224 may be passed along to this next pipeline handler; otherwise, outgoing experimentation handler 212d may pass the response to client 206. In FIG. 4, outgoing experimentation handler 212d may pass response 224 to outgoing tracking handler 212c. Outgoing tracking handler 212c receives response 224 and closes out request 220 for the request identifier included in the response. By outgoing tracking handler 212c closing out request 220, this indicates to tracking cube 214c that the request has been responded to by the application. Additionally, responsive to the close indication by outgoing tracking handler 212b, tracking cube 214c may push out the tracking information to other information systems (e.g., an associated cube or to an information repository). In an example, the tracking information specifies that for this particular unique request identifier, application 204 logged behaviors "X," "Y," and "Z."

If another pipeline handler is included in outgoing pipeline 212 after outgoing tracking handler 212c, response 224 may be passed along to this next pipeline handler; otherwise, outgoing tracking handler 212c may pass the response to client 206. In FIG. 4, outgoing tracking handler 212c may pass response 224 to outgoing personalization handler 212b. Outgoing personalization handler 212b receives response 224 and closes out request 220 for the request identifier included in the response. By outgoing personalization handler 212b closing out request 220, this indicates to personalization cube 214c that the request has been responded to by the application. Additionally, responsive to the close indication by outgoing personalization handler 212b, personalization cube 214b may push out the personalization information to other information systems (e.g., an associated cube or to an information repository).

If another pipeline handler is included in outgoing pipeline 212 after outgoing personalization handler 212b, response 224 may be passed along to this next pipeline handler; otherwise, outgoing personalization handler 212b may pass the response to client 206. In FIG. 4, outgoing personalization handler 212b may pass response 224 to outgoing logging handler 212a. Outgoing logging handler 212a receives response 224 and closes out request 220 for the request identifier included in the response by logging the close time and the associated identifier. Outgoing logging handler 212a may push out the logging information to other information systems (e.g., an associated cube or to an information repository). Outgoing pipeline 212 may send response 224 to client 206, and client 206 may receive the response.

V. Pipeline as a Service

In some embodiments, a pipeline may be part of the application framework. For example, in FIG. 2, the pipelines (e.g., incoming and outgoing pipelines) may be integrated into the application framework. In an example, if an application is written in JAVA®, the pipelines typically fit in the same process written in JAVA® and may only work for those frameworks. Trademarks are the property of their respective owners. Traditionally, a new pipeline is reconstructed for each new application framework. It may be costly and inefficient to reconstruct a new pipeline for each new application framework.

The pipeline may be taken out of the process in which the application or cubes run. In this example, the pipeline handlers that are part of incoming pipeline 210 and/or outgoing pipeline 212 may run in a process separate from the application and cubes, thus providing a pipeline as a service. Providing a pipeline as a service may provide a "neutral" pipeline that can be easily integrated with other architectures that are not native to current implementations. As such, it may be unnecessary to have one infrastructure per language specification, resulting in saved costs. Rather, the pipeline may be used for all the languages in which an application is written, and is independent of the framework.

Additionally, it may be unnecessary for a developer developing the business logic for application 204 to set up a context (e.g., programming language, etc.) before the application is accessed. The developer may be better able to focus on application logic, and not the infrastructure below it. Further, if pipeline handlers that are part of a pipeline are developed by different teams, they may be easily integrated into the pipeline. Additionally, the pipeline may be lighter weight than conventional pipelines, which are native to a framework.

A. Pipeline as a Service may be Coupled to Multiple Frameworks

In some examples, the pipeline (e.g., incoming pipeline 210 and/or outgoing pipeline 212) is a separate component that exists outside of the application framework, and may be connected to different frameworks. The pipeline may provide the same functionality and services to different applications or the same application written in different languages. As such, other applications may receive requests from or send responses to the pipeline.

Figure 5:
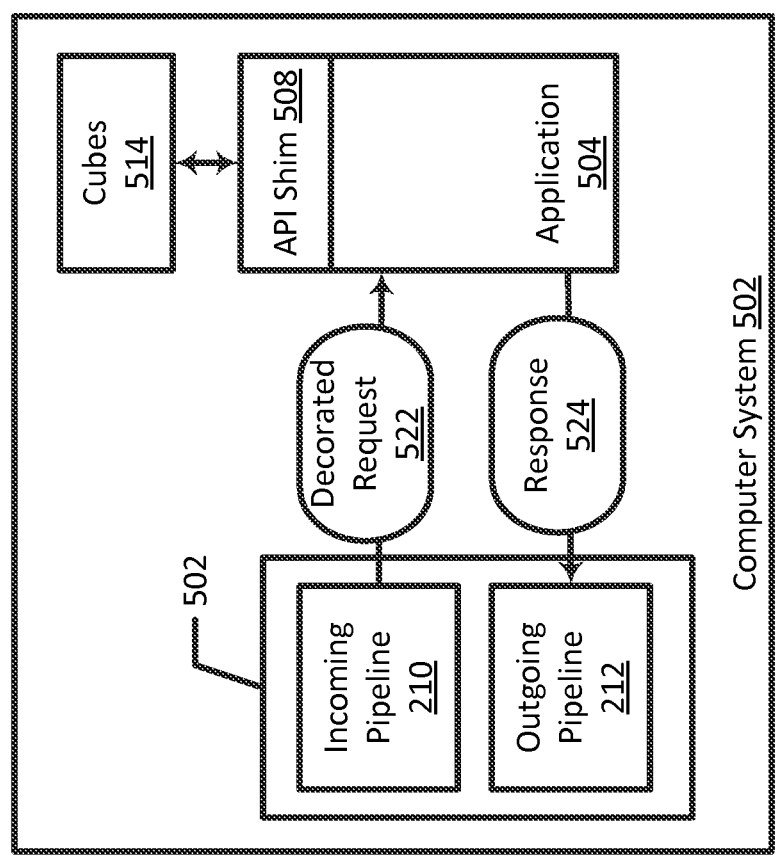
FIG. 5 is a schematic view illustrating an embodiment of a system that implements a pipeline as a service.

FIG. 5 is a schematic view 500 illustrating an embodiment of a system that implements a pipeline as a service. In FIG. 5, computer system 502 includes an application 504, a pipeline as a service 502, and cubes 514. Pipeline as a service 502 includes incoming pipeline 210 and outgoing pipeline 212, which may be the same pipelines used in computer system 202 and that interact with application 204 and cubes 214 in FIG. 2. Pipeline as a service 502 may reside in the same computer system as the one in which the application and cubes reside or may be reside in a different computer system. Additionally, although FIG. 2 illustrates a framework as a service, pipeline as a service 502 may be coupled to a framework that may or may not be a framework as a service or incorporated into a framework as a service.

Pipeline as a service 502 may be plugged into different application frameworks (e.g., see FIGS. 2 and 5) and may be coupled to any framework. For example, pipeline as a service 502 may be coupled to a first framework and to a second framework. In FIG. 5, incoming pipeline 210 may decorate a request received from a client and generate a decorated request 522. Additionally, outgoing pipeline 212 may receive response 524, which is responsive to request 522. Outgoing pipeline 212 may process response 524 and send it to the client.

To integrate pipeline as a service 502 into an application framework, the integration of the framework's request and response management may be removed from the pipeline. Additionally, the communication interface in and out of the pipeline may be defined. When a pipeline is integrated into a framework, the pipeline and application may run in the same process, so it may be unnecessary to provide this communication interface. With pipeline as a service 502, however, the pipeline runs in a different process than the application and possibly the cubes. Incoming pipeline 210 and outgoing pipeline 212 in pipeline as a service 502 may communicate with services and components outside of computer system 502. It may be desirable for these communication interfaces to be lightweight because if they are too heavy, pipeline as a service 502 may be unable to handle a large amount of requests.

B. Pipeline as a Service may be Coupled to other Infrastructure Components

A cube may be one service delivery mechanism, but it should be understood that other service delivery mechanisms are possible. Additionally, not only may pipeline as a service 502 be coupled to an application framework, pipeline as a service may also be coupled to infrastructure components that process requests or responses (e.g., load balancer).

Figure 6:
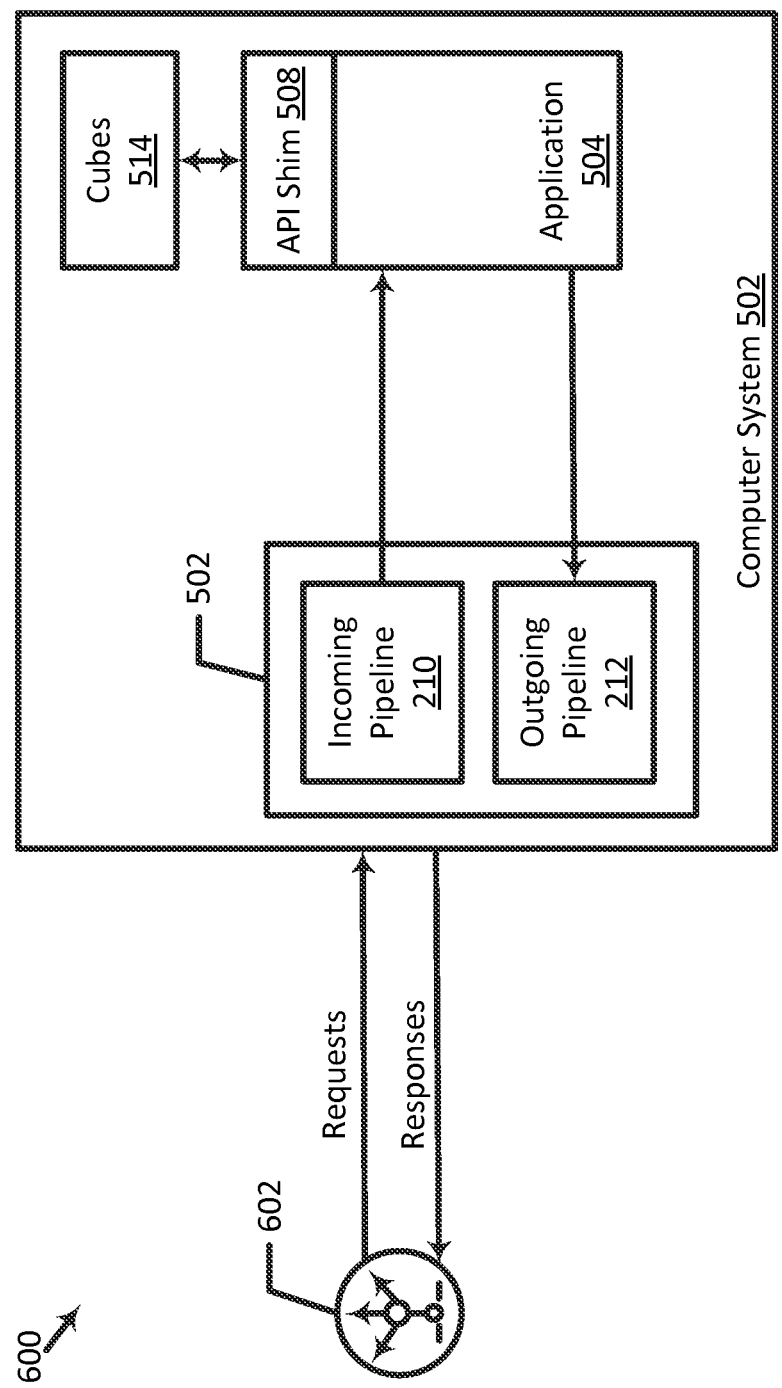
FIG. 6 is a schematic view illustrating an embodiment of pipeline as a service coupled to a load balancer.

FIG. 6 is a schematic view 600 illustrating an embodiment of pipeline as a service 502 coupled to a load balancer 602. In some examples, pipeline as a service 502 may be included in load balancer 602, which may pipeline a large amount of requests regardless of which framework they are for. The pipelines in pipeline as a service 502 may communicate with an application or cubes independent of the incoming and/or outgoing protocols.

In some examples, a pipeline handler may receive an input and emit zero, one, or more outputs. A developer of a pipeline handler may choose one or more models of a plurality of models for the pipeline handler to implement. The developer may choose an interface that makes the most sense for the pipeline handler, and provide a service provider interface (SPI) at the pipeline handler for invocation by other components to implement the model. In an example, a first model provides zero output based on a single input, a second model provides one output based on a single input, a third model provides a plurality of outputs based on a single input, and a fourth model provides a future output based on a single input. A pipeline handler or application may have one or more SPIs that forward zero, one, multiple, and/or future outputs. In an example, an application or load balancer invokes an SPI at a pipeline handler.

A pipeline handler may forward zero outputs based on a single request if the content in the request does not have enough information for the pipeline handler to make an informed decision or to process the request. In this case, the pipeline handler may wait for another request before passing it to the next pipeline handler in the pipeline. In an example, an authentication pipeline handler may provide zero outputs based on a single input. The authentication pipeline handler may receive a request including partial authentication information. In an example, the request does not provide the authentication pipeline handler with enough information to process the authentication request. In this example, the authentication pipeline handler may wait for another request including more authentication information to process and then pass the request along to the next pipeline handler. Accordingly, the authentication pipeline handler may have a first SPI that forwards zero responses based on a single input and may also have a second SPI that forwards one response based on a single input.

A pipeline handler may forward one output based on a single request if the content in the request provides the pipeline handler with enough information to make an informed decision and to process the request. In an example, a personalization pipeline handler may provide one output based on a single input. Accordingly, the personalization pipeline handler may have an SPI that forwards one response based on the single input.

A pipeline handler may forward a plurality of outputs based on a single request. A request may be broken down into a plurality of request chunks. A response may be broken down into a plurality of response chunks. In an example, application 504 may be thought of as a pipeline handler that can receive a response and provide one or more outputs based on the response. Accordingly, application 504 may have a first SPI that forwards one response based on a single input, and may also have a second SPI that forwards a plurality of response chunks based on a single input. Application 504 may receive a request and break it down into request chunks, process each of the request chunks, and output a response chunk for each request chunk.

VI. Log Aggregation

Figure 7:
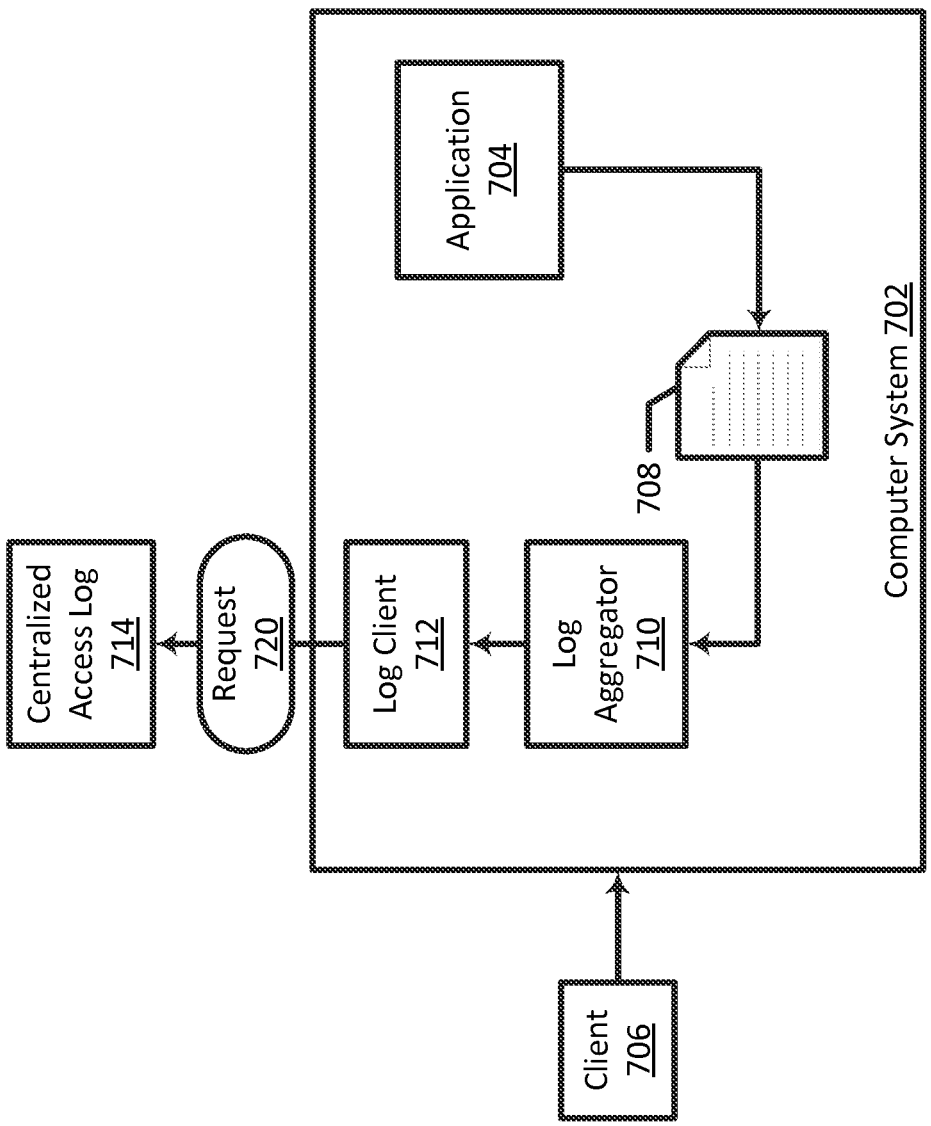
FIG. 7 is a schematic view illustrating an embodiment of a system including a log aggregator.

FIG. 7 is a schematic view 700 illustrating an embodiment of a system including a log aggregator. In FIG. 7, computer system 702 includes an application 704, one or more log records 708, a log aggregator 710, and a log client 712. Application 704 may perform some processing for one or more requests associated with unique identifiers, and may create one or more log records 708. In an example, if an error occurs in response to processing a request, which is associated with a unique identifier, application 704 may log the error as part of the request. Accordingly, if the request is erroneous, the events taking place up to the error may be easily traced. In another example, if a notable event occurs in response to processing a request, which is associated with a unique identifier, application 704 may log the notable event as part of the request. Accordingly, the events taking place up to the notable event may be easily traced.

Application 704 may log one or more events associated with the request, and create one or more log records 708 based on the logging. Application 704 may open a transaction based on logging a request associated with a new unique identifier. Log aggregator 710 may receive an indication that a request has been completed. In response to the indication, log aggregator 710 may aggregate all log records 708 created based on processing the particular request and send them to log client 712 to store in a centralized access log 714. Log records 708 may include a unique identifier associated with the request. Centralized access log 714 is a logging system that may receive one or more requests 720 from log client 712 to store aggregated log records associated with a request. Centralized access log 714 has the notion of a request, and each request may be associated with a unique identifier. Centralized access log 714 may be a system that is integrated into a framework as a service or pipeline as a service.

Application 704, log aggregator 710, and log client 712 may keep track of the log records associated with a request, and log client 712 may insert them into centralized access log 714 to complete the transaction. In an example, in response to receiving the aggregated log records, log client 712 closes the transaction associated with the request (or the unique identifier that identifies the request).

As discussed, log aggregator 710 may receive an indication that a request has been completed and thus log aggregator 710 may aggregate the log records associated with the request and send them to log client 712. Timing issues, however, may present themselves because there is no guarantee that when application 704 logs events, that the log records are immediately created. Rather, the events may be buffered and then logged. Accordingly, log aggregator 710 may be unaware of when it should aggregate the log records associated with the request and send the aggregated log records to log client 712 because log aggregator 710 does not know when all events that can be associated with the request have been logged.

In some examples, log aggregator 710 sets a timeout period (e.g., 15 milliseconds), and collects information and identifies currently active transactions associated with requests. If log aggregator 710 determines that no log records associated with the request have been created within the timeout period, then this may be an indication to log aggregator 710 that the request has been completed. Accordingly, log aggregator 710 may aggregate all log records 708 associated with the request and send them to log client 712 to store in a centralized access log 714. In an example, a transaction is open when a request associated with a new unique identifier is received. Log client 712 may send a request 720 including the aggregated log files 708 associated with the request to centralized access log 714. After centralized access log 714 stores the log records associated with the unique identifier, log client 712 may close the transaction. A request may be closed based on its associated transaction being closed.

The timeout period may be relative to the most recently created log record, and may depend on, for example, the framework or stack. If application 704 logs an event based on processing a request associated with a closed transaction, the administrator may manually go back and edit the transaction to include the log record. If a log worthy event occurs that should be recorded in centralized access log 714 and log aggregator 710 no longer has an active request associated with the log worthy event open, an administrator may determine that the transaction associated with the request closed too soon. For example, log aggregator 710 may detect a log record that has not been sent to log client 712 and based on a request associated with a closed transaction. In this example, log aggregator 710 may send an alert indicating that the log record has not been sent to log client 712 for storage in centralized access log 714, but should have been. The administrator may be alerted and manually edit the transaction to include this log record.

In response to detecting the log record associated with a closed transaction, an administrator or log aggregator 710 may extend the timeout period to a longer time (e.g., 25 milliseconds). To prevent adjusting the timeout period too much and to provide a stable timeout period, log aggregator 710 may count the number of log records that have been associated with a closed transaction. If the number of log records that have been associated with a closed transaction exceeds a threshold, the timeout period may be too short and the administrator or log aggregator 710 may increase the timeout period. Referring back to FIG. 2, log aggregator 710 may reside in computer system 202 and may be part of the same process as application 204.

VII. Example Methods

Figure 8:
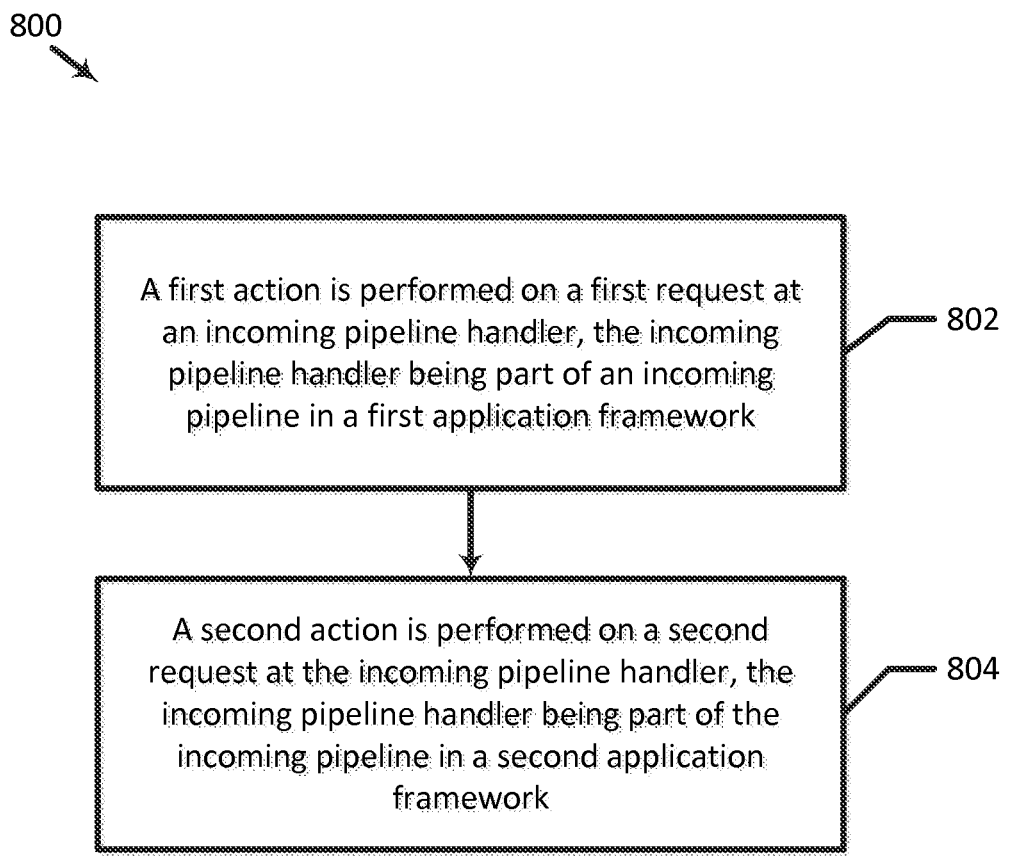
FIG. 8 is a flowchart illustrating an embodiment of a method for providing a pipeline as a service.

FIG. 8 is a flowchart illustrating an embodiment of a method 800 for providing a pipeline as a service. Method 800 is not meant to be limiting and may be used in other applications other than the applications discussed below. Method 800 includes blocks 802 and 804. In a block 802, a first action is performed on a first request at an incoming pipeline handler, the incoming pipeline handler being part of an incoming pipeline in a first application framework. In a block 804, a second action is performed on a second request at the incoming pipeline handler, the incoming pipeline handler being part of the incoming pipeline in a second application framework.

It should be understood that additional processes may be performed before, during, or after blocks 802 and 804 discussed above. It is also understood that one or more of the blocks of method 800 described herein may be omitted, combined, or performed in a different sequence as desired.

Figure 9:
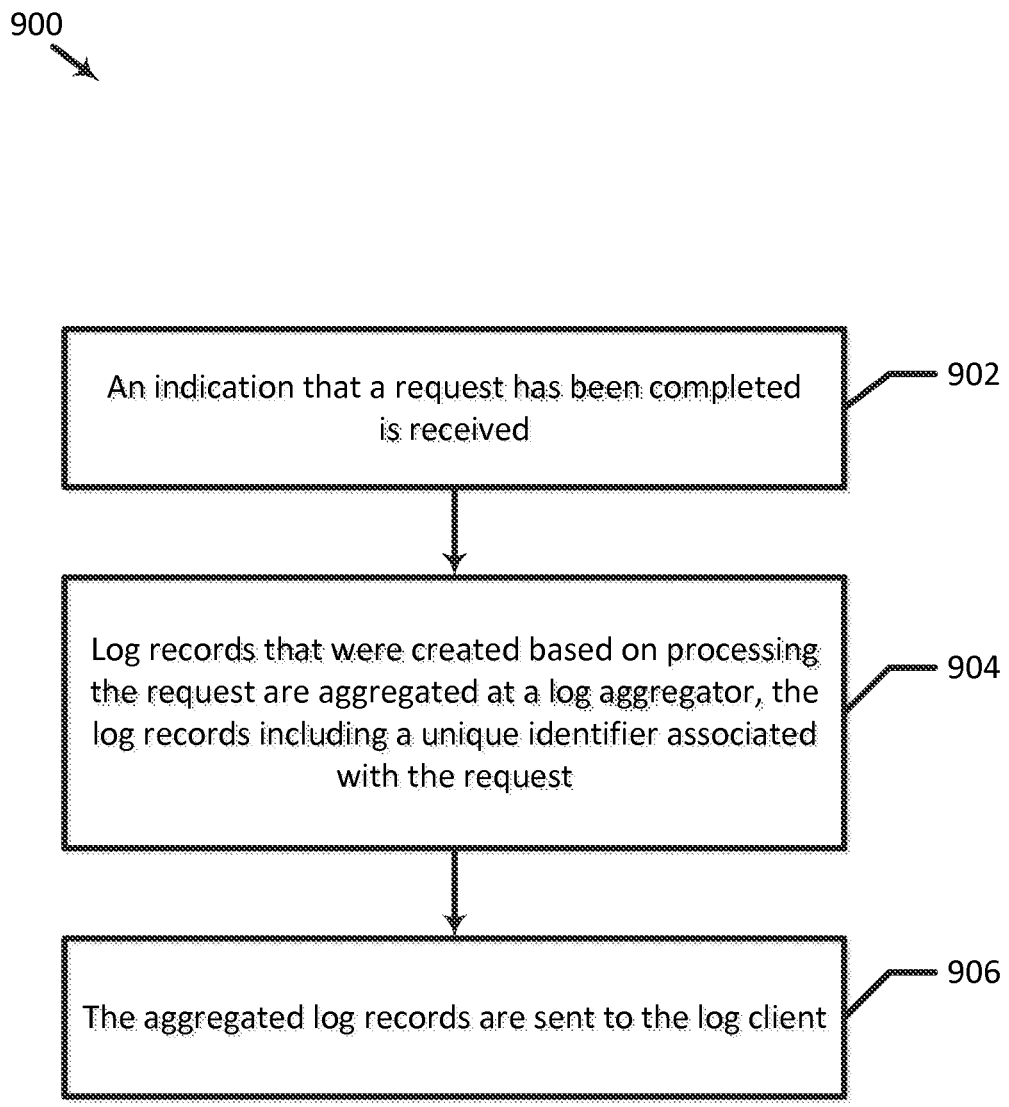
FIG. 9 is a flowchart illustrating an embodiment of a method for storing aggregated log records associated with a request.

FIG. 9 is a flowchart illustrating an embodiment of a method 900 for storing aggregated log records associated with a request. Method 900 is not meant to be limiting and may be used in other applications other than the applications discussed below. Method 900 includes blocks 902-906. In a block 902, an indication that a request has been completed is received. In a block 904, log records that were created based on processing the request are aggregated at a log aggregator, the log records including a unique identifier associated with the request. In a block 906, the aggregated log records are sent to the log client.

It should be understood that additional processes may be performed before, during, or after blocks 902-906 discussed above. It is also understood that one or more of the blocks of method 900 described herein may be omitted, combined, or performed in a different sequence as desired.

VIII. Example Computing Systems

Figure 10:
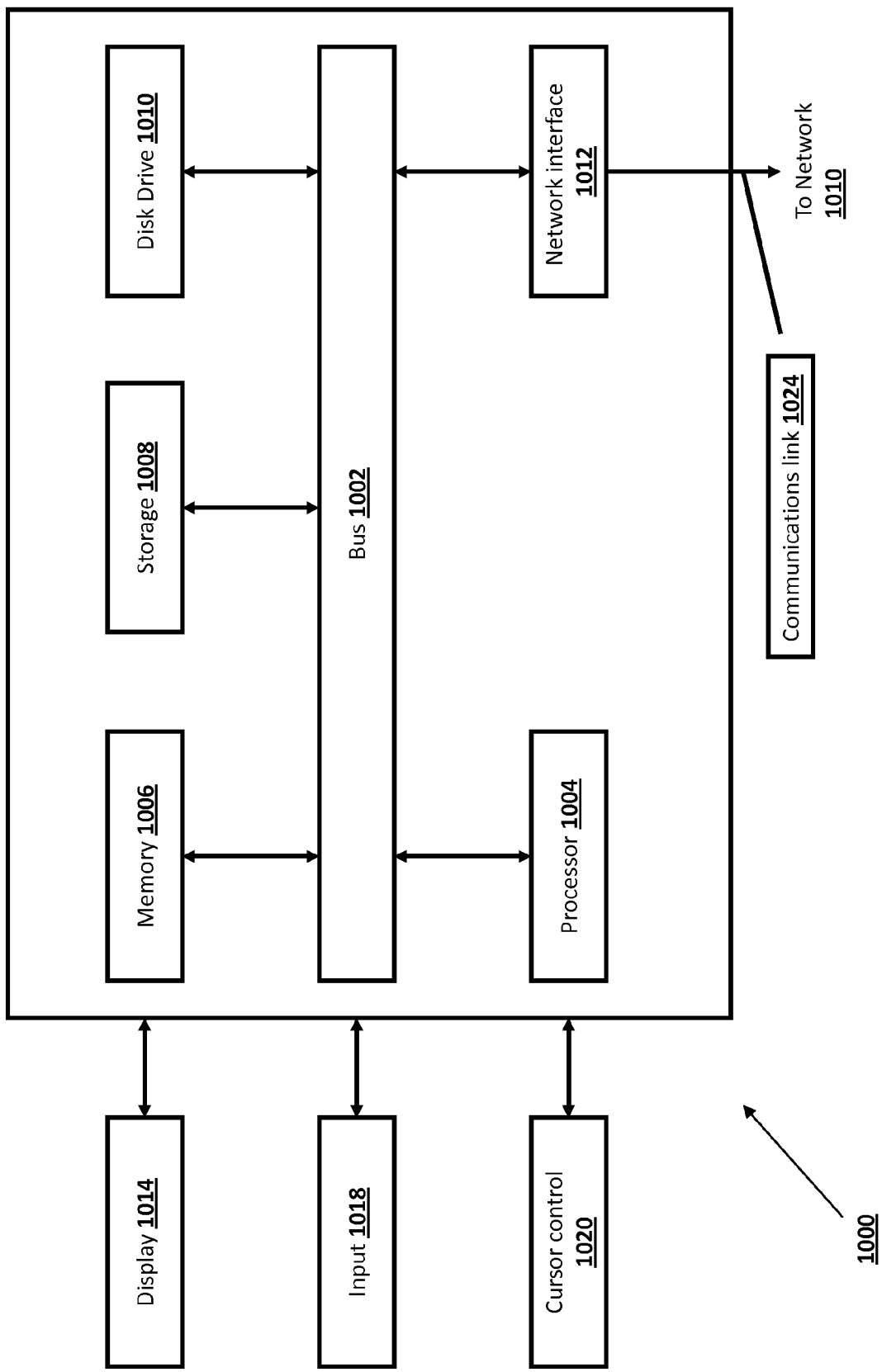
FIG. 10 is a schematic view illustrating an embodiment of a computer system.

Referring now to FIG. 10, an embodiment of a computer system 1000 suitable for implementing, for example, the framework as a service, pipeline as a service, and/or log aggregation, is illustrated. It should be appreciated that other devices discussed above may be implemented as computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), and/or a cursor control component 1020 (e.g., mouse, pointer, or trackball). In one implementation, disk drive component 1010 may include a database having one or more disk drive components.

In accordance with embodiments of the present disclosure, computer system 1000 performs specific operations by processor 1004 executing one or more sequences of instructions contained in memory component 1006, such as described herein with respect to incoming pipeline 210, outgoing pipeline 212, applications, or cubes 214. Such instructions may be read into system memory component 1006 from another computer readable medium, such as static storage component 1008 or disk drive component 1010. In other embodiments, hard-wired circuitry may be used in place of or in combination with software instructions to implement the present disclosure.

Logic may be encoded in a computer readable medium, which may refer to any medium that participates in providing instructions to processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 1010, volatile media includes dynamic memory, such as system memory component 1006, and transmission media includes coaxial cables, copper wire, and fiber optics, including wires that include bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences (e.g., methods 100, 800, and/or 900) to practice the present disclosure may be performed by computer system 1000. In various other embodiments of the present disclosure, a plurality of computer systems 1000 coupled by a communication link 1024 to network 1010 (e.g., such as a LAN, WLAN, PTSN, and/or various other wired or wireless networks, including telecommunications, mobile, and cellular phone networks) may perform instruction sequences to practice the present disclosure in coordination with one another.

Computer system 1000 may transmit and receive messages, data, information and instructions, including one or more programs (e.g., application code) through communication link 1024 and network interface component 1012. Network interface component 1012 may include an antenna, either separate or integrated, to enable transmission and reception via communication link 1024. Received program code may be executed by processor 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for providing a pipeline as a service, comprising:
   a non-transitory memory storing first instructions associated with an incoming pipeline handler; and
   one or more hardware processors coupled to the memory and operable to read the first instructions from the memory to cause the system to perform operations comprising:
   providing the incoming pipeline handler as a service to a first application in a first application framework and to a second application in a second application framework, wherein the incoming pipeline handler is provided within a third application framework different from the first application framework and the second application framework;

intercepting a first request from a first client device directed at the first application;

processing the first request as part of an incoming pipeline in the first application framework for processing incoming requests for the first application, wherein processing the first request comprises:
  determining that the first request is originated from a first user, and
  extracting data associated with the first user from the first request;

intercepting a second request from a second client device directed at the second application; and processing the second request as part of an incoming pipeline in the second application framework for processing incoming requests for the second application, wherein processing the second request comprises:
  determining whether the second request is originated from the first user, and
  in response to a determination that the second request is originated from the first user, appending the data of the first user extracted from the first request to the second request before sending the second request to the second application.

2. The system of claim 1, wherein the operations further comprise:
  sending the processed first request to the first application; and
  sending the processed second request to the second application.

3. The system of claim 2, wherein the non-transitory memory further stores second instructions associated with an outgoing pipeline handler corresponding to the incoming pipeline handler, wherein the one or more hardware processors are operable to read the second instructions from the memory to cause the system to perform operations further comprising:
  providing, within the third application framework, the outgoing pipeline handler as a service to the first application in the first application framework and to the second application in the second application framework;
  intercepting a first response from the first application directed at the first client device and a second response from the second application directed at the second client device, wherein the first response is generated by the first application in response to the first request and the second response is generated by the second application in response to the second request;
  extracting information from the first response before sending the first response to the first client device as part of an outgoing pipeline in the first application framework for processing outgoing responses for the first application; and
  extracting information from the second response before sending the second response to the second client device as part of an outgoing pipeline in the second application framework for processing outgoing responses for the second application.

4. The system of claim 1, wherein processing the first request further comprises dividing the first request into a plurality of request blocks before sending the plurality of request blocks to the first application.

5. The system of claim 1, wherein the data extracted from the first request comprises personal data associated with the first user.

6. The system of claim 1, further comprising a load balancer interface communicatively coupled with a load balancer in the first application framework, wherein the operations further comprise:
  intercepting, via the load balancer interface, a third request from a load balancer directed at the first application; and
  revising the third request with additional information as part of the incoming pipeline in the first application framework for the first application.

7. The system of claim 1, wherein the operations further comprise:
  providing, within the third application framework, a cube as a service to the first and second applications, wherein the cube is accessible by the first and second applications via an application programming interface layer; and
  in response to receiving a request from the second application and based on the revised second request, transmitting additional personal data associated with the first user to the second application.

8. A method for providing a pipeline as a service, comprising:
  providing an incoming pipeline handler as a service to a first application in a first application framework and to a second application in a second application framework, wherein the incoming pipeline handler is provided within a third application framework different from the first application framework and the second application framework;
  intercepting, by the incoming pipeline handler, a first request from a first client device directed at the first application;
  processing, by the incoming pipeline handler, the first request as part of an incoming pipeline in the first application framework for processing incoming requests for the first application, wherein processing the first request comprises:
    determining that the first request is originated from a first user, and
    extracting data associated with the first user from the first request;
  intercepting, by the incoming pipeline handler, a second request from a second client device directed at the second application; and
  processing, by the incoming pipeline handler, the second request as part of an incoming pipeline in the second application framework for processing incoming requests for the second applications, wherein processing the second request comprises:
    determining whether the second request is originated from the first user, and
    in response to a determination that the second request is originated from the first user, appending the data of the first user extracted from the first request to the second request before sending the second request to the second application.

9. The method of claim 8, further comprising:
  sending the processed first request to the first application; and
  sending the processed second request to the second application.

10. The method of claim 9, further comprising:
- providing, within the third application framework, an outgoing pipeline handler as a service to the first application in the first application framework and to the second application in the second application framework;
- intercepting, by the outgoing pipeline handler, a first response from the first application directed at the first client device and a second response from the second application directed at the second client device, wherein the first response is generated by the first application in response to the first request and the second response is generated by the second application in response to the second request;
- extracting, by the outgoing pipeline handler, information from the first response before sending the first response to the first client device as part of an outgoing pipeline in the first application framework for processing outgoing responses for the first application; and
- extracting, by the outgoing pipeline handler, information from the second response before sending the second response to the second client device as part of an outgoing pipeline in the second application framework for processing outgoing responses for the second application.

11. The method of claim 8, wherein processing the first request further comprises dividing the first request into a plurality of request blocks before sending the plurality of request blocks to the first application.

12. The method of claim 8, wherein
the data extracted from the first request comprises personal data associated with the first user.

13. The method of claim 8, further comprising:
- intercepting a third request from a load balancer directed at the first application; and
- revising, by the incoming pipeline handler, the third request as part of the incoming pipeline in the first application framework for the first application.

14. A non-transitory computer-readable medium comprising instructions which, in response to execution by a computer system, cause the computer system to perform operations comprising:
- providing an incoming pipeline handler as a service to a first application in a first application framework and to a second application in a second application framework, wherein the incoming pipeline handler is provided within a third application framework different from the first application framework and the second application framework;
- intercepting, by the incoming pipeline handler, a first request from a first client device directed at the first application;
- processing, by the incoming pipeline handler, the first request as part of an incoming pipeline in the first application framework for processing incoming requests for the first application, wherein processing the first request comprises:
  - determining that the first request is originated from a first user, and
  - extracting data associated with the first user from the first request;
- intercepting, by the incoming pipeline handler, a second request from a second client device directed at the second application;
- processing, by the incoming pipeline handler, the second request as part of the incoming pipeline in the second application framework for processing incoming requests for the second application, wherein processing the second request comprises:
  - determining whether the second request is originated from the first user, and
  - in response to a determination that the second request is originated from the first user, appending the data of the first user extracted from the first request to the second request before sending the second request to the second application.

15. The non-transitory computer-readable medium of claim 14, wherein the operations further comprise:
- sending the processed first request to the first application; and
- sending the processed second request to the second application.

16. The non-transitory computer-readable medium of claim 15, wherein the operations further comprise:
- providing, within the third application framework, an outgoing pipeline handler as a service to the first application in the first application framework and to the second application in the second application framework;
- intercepting, by the outgoing pipeline handler, a first response from the first application directed at the first client device and a second response from the second application directed at the second client device, wherein the first response is generated by the first application in response to the first request and the second response is generated by the second application in response to the second request;
- extracting, by the outgoing pipeline handler, information from the first response before sending the first response to the first client device as part of an outgoing pipeline in the first application framework for processing outgoing responses for the first application; and
- extracting, by the outgoing pipeline handler, information from the second response before sending the second response to the second client device as part of an outgoing pipeline in the second application framework for processing outgoing responses for the second application.

17. The non-transitory computer-readable medium of claim 14, wherein the
data extracted from the first request comprises personal data associated with the first user.

18. The non-transitory computer-readable medium of claim 17, wherein the operations further comprise:
- providing, within the third application framework, a cube as a service to the first and second applications, wherein the cube is accessible by the first and second applications via an application programming interface layer; and
- in response to receiving a request from the second application and based on the revised second request, transmitting additional personal data associated with the first user to the second application.

* * * * *

UNITED STATES PATENT AND TRADEMARK OFFICE
CERTIFICATE OF CORRECTION

PATENT NO. : 9,817,694 B2
APPLICATION NO. : 14/706786
DATED : November 14, 2017
INVENTOR(S) : Akara Sucharitakul It is certified that error appears in the above-identified patent and that said Letters Patent is hereby corrected as shown below:

In the Claims

In Column 18, Line 54, change "requests for the second applications," to --requests for the second application,--.

Signed and Sealed this
Twenty-eighth Day of May, 2019

Andrei Iancu
*Director of the United States Patent and Trademark Office*